US010412767B2

(12) United States Patent
Liu et al.

(10) Patent No.: US 10,412,767 B2
(45) Date of Patent: Sep. 10, 2019

(54) SYSTEM AND METHOD FOR INITIAL ATTACHMENT IN A COMMUNICATIONS SYSTEM UTILIZING BEAM-FORMED SIGNALS

(71) Applicant: Futurewei Technologies, Inc., Plano, TX (US)

(72) Inventors: Bin Liu, San Diego, CA (US); Richard Stirling-Gallacher, San Diego, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 218 days.

(21) Appl. No.: 15/133,285

(22) Filed: Apr. 20, 2016

(65) Prior Publication Data

US 2017/0311353 A1    Oct. 26, 2017

(51) Int. Cl.
*H04W 74/08* (2009.01)
*H04W 56/00* (2009.01)
(Continued)

(52) U.S. Cl.
CPC ........ *H04W 74/0833* (2013.01); *H04B 7/063* (2013.01); *H04B 7/0617* (2013.01);
(Continued)

(58) Field of Classification Search
CPC ......... H04W 74/0833; H04W 56/0015; H04W 72/0446
See application file for complete search history.

(56) References Cited

U.S. PATENT DOCUMENTS

| 9,736,848 B2 * | 8/2017 | Kim ................. H04W 72/046 |
| 2007/0050441 A1 * | 3/2007 | Taenzer ................. H04R 3/005 |
| | | 708/446 |

(Continued)

FOREIGN PATENT DOCUMENTS

| WO | 2013032188 A2 | 3/2013 |
| WO | 2013089731 A1 | 6/2013 |
| WO | 2014104758 A1 | 7/2014 |

OTHER PUBLICATIONS

Liu, et al., "All-Digital Synchronization for SC/OFDM Mode of IEEE 802.15.3c and IEEE 802.11ad," IEEE Transactions on Circuits and Systems—I: Regular Papers, vol. 62, No. 2, Feb. 2015, pp. 545-553.

*Primary Examiner* — Gregory B Sefcheck
*Assistant Examiner* — Jael M Ulysse
(74) *Attorney, Agent, or Firm* — Slater Matsil, LLP

(57) ABSTRACT

A method for operating a user equipment (UE) in a millimeter wave (mmWave) communications system includes receiving a first wide beam beam-formed reference signal from a mmWave evolved NodeB (eNB) during an initial time interval, the first wide beam beam-formed reference signal carrying timing information, detecting a wide beam boundary between the first wide beam beam-formed reference signal and a second wide beam beam-formed reference signal during a subsequent time interval, wherein both the first wide beam beam-formed reference signal and the second wide beam beam-formed reference signal are rotated by a narrow beam beam-width during each intermediate time interval between the initial time interval and the subsequent time interval, and informing the mmWave eNB of an indication that the UE detected the wide beam boundary during the subsequent time interval, the indication being used to assign a narrow beam direction to the UE.

30 Claims, 9 Drawing Sheets

(51) Int. Cl.
*H04W 72/04* (2009.01)
*H04B 7/06* (2006.01)
*H04B 7/08* (2006.01)
*H04W 24/02* (2009.01)
*H04W 84/04* (2009.01)

(52) U.S. Cl.
CPC ......... *H04B 7/0639* (2013.01); *H04B 7/0695* (2013.01); *H04B 7/088* (2013.01); *H04W 24/02* (2013.01); *H04W 56/0015* (2013.01); *H04W 72/046* (2013.01); *H04W 72/0446* (2013.01); *H04W 84/042* (2013.01)

(56) References Cited

U.S. PATENT DOCUMENTS

| | | | |
|---|---|---|---|
| 2007/0291589 A1* | 12/2007 | Kawabata | G01S 7/52003 367/88 |
| 2010/0226337 A1* | 9/2010 | Yang | H04B 7/0615 370/330 |
| 2012/0155571 A1* | 6/2012 | Yang | H04B 7/024 375/295 |
| 2013/0059619 A1* | 3/2013 | Kim | H04W 72/046 455/509 |
| 2013/0089731 A1 | 4/2013 | Imanaka et al. | |
| 2013/0121185 A1* | 5/2013 | Li | H04W 72/046 370/252 |
| 2013/0155847 A1* | 6/2013 | Li | H04W 24/04 370/225 |
| 2013/0223251 A1* | 8/2013 | Li | H04W 72/046 370/252 |
| 2013/0237218 A1* | 9/2013 | Li | H04W 48/16 455/434 |
| 2013/0272220 A1* | 10/2013 | Li | H04W 72/046 370/329 |
| 2013/0301619 A1* | 11/2013 | Singh | H04W 56/004 370/336 |
| 2014/0010475 A1 | 1/2014 | Crandall et al. | |
| 2014/0073337 A1* | 3/2014 | Hong | H04W 16/28 455/452.1 |
| 2014/0128109 A1* | 5/2014 | Li | H04W 68/02 455/458 |
| 2015/0103934 A1* | 4/2015 | Nam | H04B 7/0413 375/260 |
| 2015/0351135 A1* | 12/2015 | Schmidt | H04W 76/02 455/450 |
| 2015/0382268 A1* | 12/2015 | Hampel | H04W 36/0072 455/436 |
| 2016/0006122 A1* | 1/2016 | Seol | H04B 7/0408 342/372 |
| 2016/0073393 A1* | 3/2016 | Kim | H04W 72/046 455/509 |
| 2016/0087705 A1* | 3/2016 | Guey | H04B 7/0617 370/336 |
| 2016/0087765 A1* | 3/2016 | Guey | H04L 27/2607 370/330 |
| 2016/0095003 A1 | 3/2016 | Yu et al. | |
| 2016/0119958 A1* | 4/2016 | Tan | H04W 74/002 370/336 |
| 2016/0165583 A1* | 6/2016 | Ho | H04B 7/0408 370/329 |
| 2016/0183233 A1* | 6/2016 | Park | H04W 16/30 370/331 |
| 2016/0190707 A1* | 6/2016 | Park | H01Q 1/246 370/334 |
| 2016/0291120 A1* | 10/2016 | Rastegar | G01S 13/751 |
| 2016/0353424 A1* | 12/2016 | Stirling-Gallacher | H04B 7/0626 |
| 2017/0055298 A1* | 2/2017 | Pawar | H04L 5/1469 |
| 2017/0207843 A1* | 7/2017 | Jung | H04B 7/0408 |

\* cited by examiner

SYSTEM AND METHOD FOR INITIAL ATTACHMENT IN A COMMUNICATIONS SYSTEM UTILIZING BEAM-FORMED SIGNALS

TECHNICAL FIELD

The present disclosure relates generally to digital communications, and more particularly to a system and method for initial attachment in a communications system utilizing beam-formed signals.

BACKGROUND

Millimeter wave (mmWave) communications systems operate in high frequencies (e.g., 30 GHz and above). Communications channels at such high frequencies have high path-loss, resulting in limited range. Beam-forming is a technique where coefficients of an antenna array are adjusted so that the radiation pattern of the antenna array is modified and oriented in a particular direction. In transmit beam-forming, the modified radiation pattern increases the amount of energy directed in the oriented direction, while in receive beam-forming, the modified radiation pattern increases sensitivity in the oriented direction. Therefore, beam-forming increases the range of the mmWave communications system.

SUMMARY OF THE DISCLOSURE

Example embodiments provide a system and method for initial attachment in a communications system utilizing beam-formed signals.

In accordance with an example embodiment, a method for operating a user equipment (UE) in a millimeter wave (mmWave) communications system is provided. The method includes receiving, by the UE, a first wide beam beam-formed reference signal from a mmWave evolved NodeB (eNB) during an initial time interval, the first wide beam beam-formed reference signal carrying timing information, detecting, by the UE, a wide beam boundary between the first wide beam beam-formed reference signal and a second wide beam beam-formed reference signal during a subsequent time interval, wherein both the first wide beam beam-formed reference signal and the second wide beam beam-formed reference signal are rotated by a narrow beam beam-width during each intermediate time interval between the initial time interval and the subsequent time interval, and informing, by the UE, the mmWave eNB of an indication that the UE detected the wide beam boundary during the subsequent time interval, the indication being used to assign a narrow beam direction to the UE.

In accordance with another example embodiment, a method for operating an eNB in a mmWave communications system is provided. The method includes beam-forming, by the eNB, reference signals and broadcast signals with a plurality of wide beams, thereby producing a plurality of wide beam beam-formed reference and broadcast signals, where the plurality of wide beams providing coverage of a coverage area of the eNB, sending, by the eNB, the plurality of wide beam beam-formed reference and broadcast signals in an initial time interval; sending, by the eNB, rotated versions of the plurality of wide beam beam-formed reference and broadcast signals in subsequent time intervals, wherein the plurality of wide beam beam-formed reference and broadcast signals are rotated by a narrow beam beam-width during each subsequent time interval, and receiving, by the eNB, an indication of a wide beam boundary from a UE.

In accordance with another example embodiment, a UE adapted to operate in an mmWave communications system is provided. The UE includes a processor, and a computer readable storage medium storing programming for execution by the processor. The programming including instructions to configure the UE to receive a first wide beam beam-formed reference signal from a mmWave eNB during an initial time interval, the first wide beam beam-formed reference signal carrying timing information, detect a wide beam boundary between the first wide beam beam-formed reference signal and a second wide beam beam-formed reference signal during a subsequent time interval, wherein both the first wide beam beam-formed reference signal and the second wide beam beam-formed reference signal are rotated by a narrow beam beam-width during each intermediate time interval between the initial time interval and the subsequent time interval, and inform the mmWave eNB of an indication that the UE detected the wide beam boundary during the subsequent time interval, the indication being used to assign a narrow beam direction to the UE.

In accordance with another example embodiment, an eNB adapted to operate in a mmWave communications system is provided. The eNB includes a processor, and a computer readable storage medium storing programming for execution by the processor. The programming including instructions to configure the eNB to beam-form reference signals and broadcast signals with a plurality of wide beams, thereby producing a plurality of wide beam beam-formed reference and broadcast signals, where the plurality of wide beams providing coverage of a coverage area of the eNB, send the plurality of wide beam beam-formed reference and broadcast signals in an initial time interval, send rotated versions of the plurality of wide beam beam-formed reference and broadcast signals in subsequent time intervals, wherein the plurality of wide beam beam-formed reference and broadcast signals are rotated by a narrow beam beam-width during each subsequent time interval, and receive an indication of a wide beam boundary from a UE.

Practice of the foregoing embodiments enables a reduction in time overhead involved in the initial attachment of a user equipment in a communications system utilizing beam-formed signals.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

One embodiment relates to systems and methods for initial attachment in a communications system utilizing beam-formed signals. For example, a UE receives a first wide beam beam-formed reference signal from a mmWave evolved NodeB (eNB) during an initial time interval, the first wide beam beam-formed reference signal carrying timing information, detects a wide beam boundary between the first wide beam beam-formed reference signal and a second wide beam beam-formed reference signal during a subsequent time interval, wherein both the first wide beam beam-formed reference signal and the second wide beam beam-formed reference signal are rotated by a narrow beam beam-width during each intermediate time interval between the initial time interval and the subsequent time interval, and informs the mmWave eNB of an indication that the UE detected the wide beam boundary during the subsequent time interval, the indication being used to assign a narrow beam direction to the UE.

The embodiments will be described with respect to example embodiments in a specific context, namely communications systems that use beam-formed signals. The embodiments may be applied to standards compliant communications systems, such as those that are compliant with Third Generation Partnership Project (3GPP), IEEE 802.11, and the like, technical standards, and non-standards compliant communications systems, that use beam-formed signals.

Figure 1:
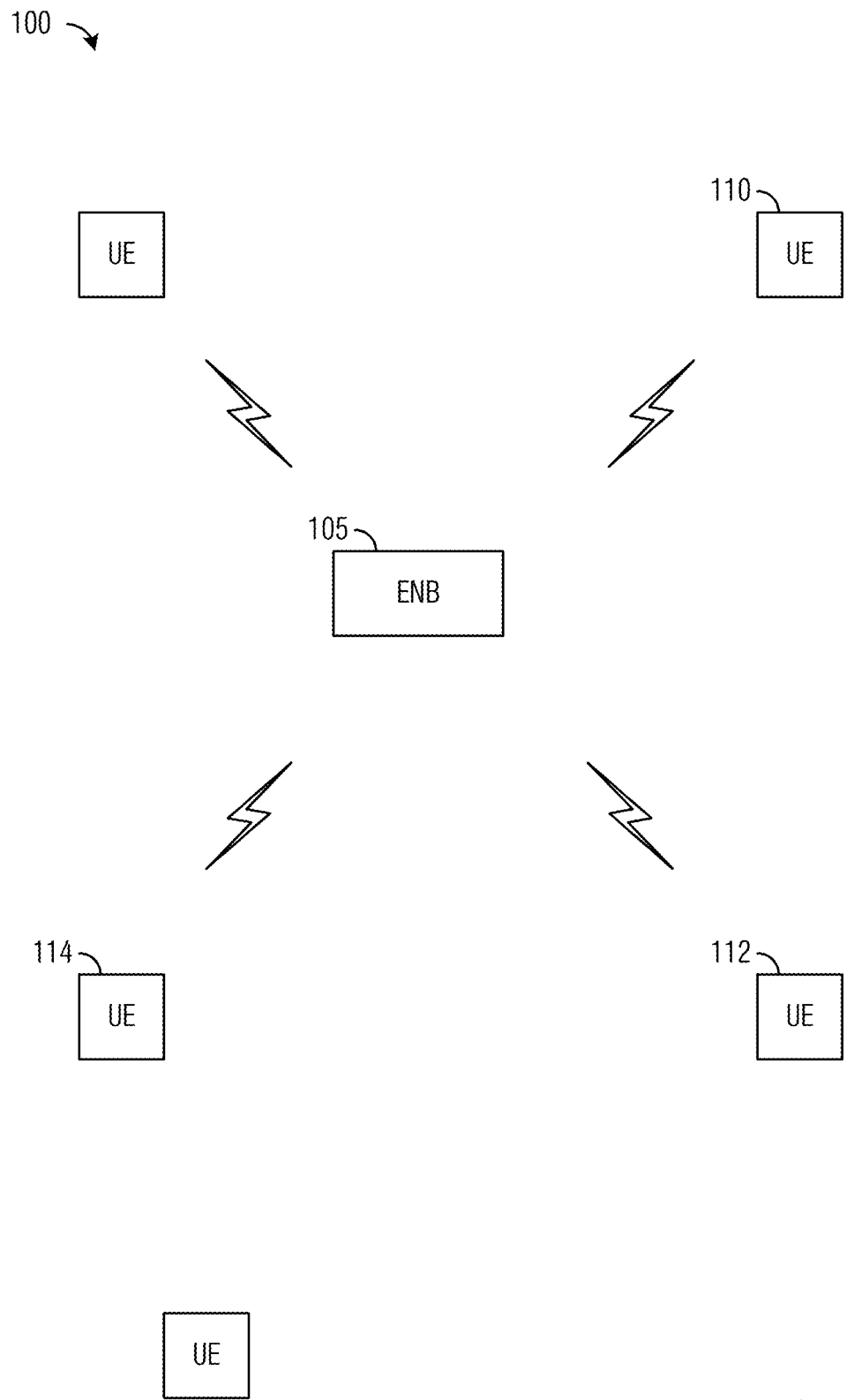
FIG. 1 illustrates an example wireless communications system according to example embodiments described herein.

FIG. 1 illustrates an example wireless communications system 100. Communications system 100 includes an evolved NodeB (eNB) 105 serving a plurality of user equipments (UEs), such as UE 110, UE 112, and UE 114. In a first operating mode, transmissions for UEs as well as transmissions by UEs pass through the eNB. The eNB allocates network resources for the transmissions to or from the UEs. eNBs may also be commonly referred to as base stations, NodeBs, remote radio heads, access points, and the like, while UEs may also be commonly referred to as mobiles, mobile stations, terminals, subscribers, users, stations, and the like. A base station (or an eNB, NodeB, remote radio head, access point, transmission point, and so on) that is serving one or more UEs may be referred to as a serving base station (SBS). A transmission point (TP) may be used to refer to any device capable of transmitting. Therefore, transmission points may refer to eNBs, base stations, NodeBs, remote radio heads, access points, UEs, mobiles, mobile stations, terminals, subscribers, users, and the like.

While it is understood that communications systems may employ multiple eNBs capable of communicating with a number of UEs, only one eNB, and a number of UEs are illustrated for simplicity.

A cell is a commonly used term that refers to a coverage area of an eNB. Typically, a cell is served by one or more sectors of a sectorized antenna of the eNB. Hence, the coverage area of the eNB includes a cell partitioned into a plurality of sectors. As an illustrative example, in a scenario where an eNB uses a three-sector antenna system, the cell of the eNB may be divided into three sectors, with each sector being covered by a separate antenna (with an example beam-width of 120 degrees) or a separate part of the total antenna system. As another illustrative example, in a scenario where an eNB uses a six-sector antenna system (where each antenna may cover a 60 degree sector, for example), the cell of the eNB may be divided into six sectors or three sectors, with each sector being covered by one or two antennas or parts sectors of the antenna system respectively.

Figure 2:
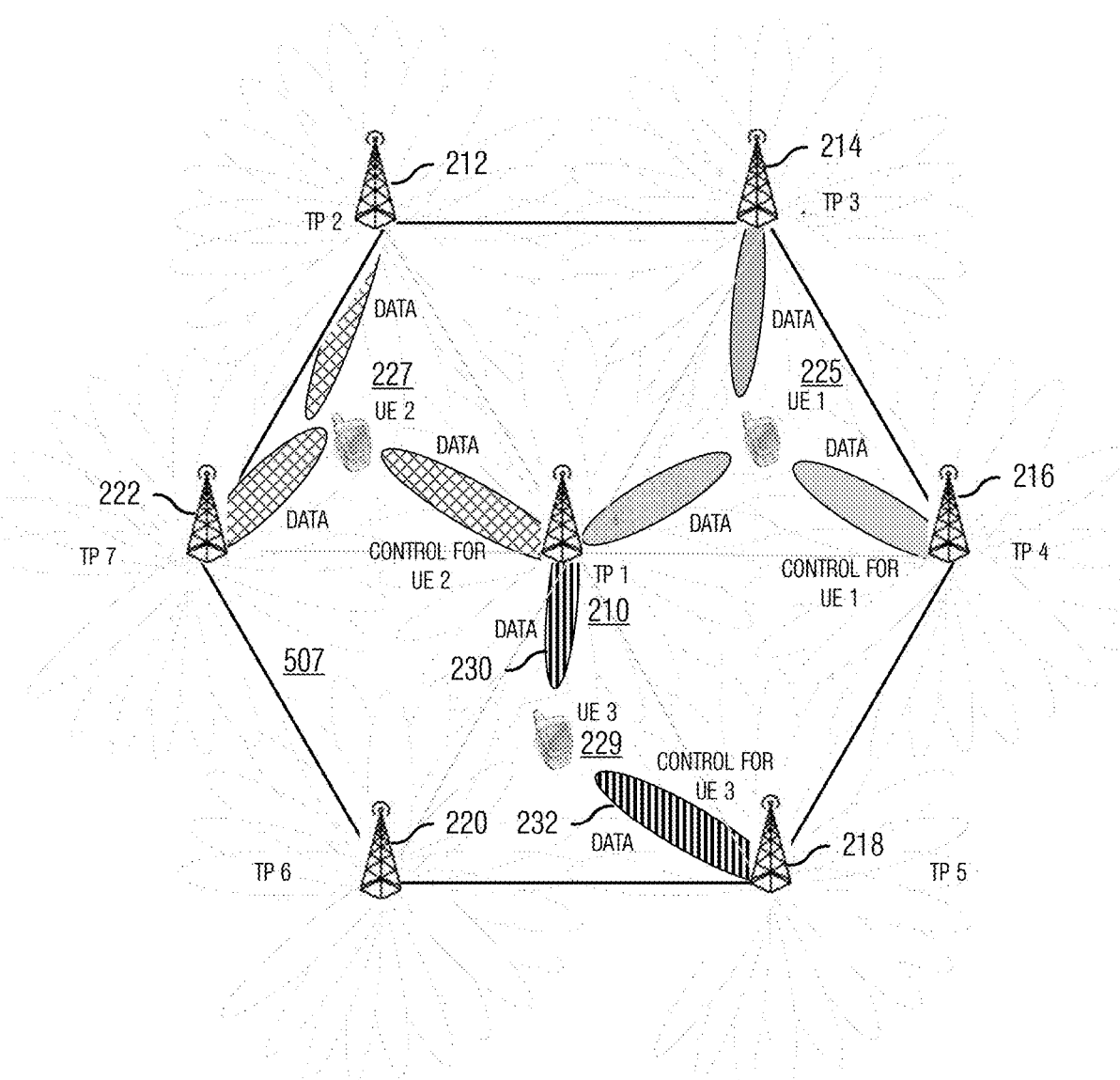
FIG. 2 illustrates an example mmWave communications system according to example embodiments described herein.

FIG. 2 illustrates an example mmWave communications system 200. mmWave communications system 200 includes a plurality of mmWave TPs, including mmWave TPs 210-222. The mmWave TPs serve mmWave UEs, such as mmWave UE 225, mmWave UE 227, and mmWave UE 229. As shown in FIG. 2, each mmWave UE is being served by a plurality of mmWave TPs. As an example, mmWave UE 225 is served by mmWave TP 210, mmWave TP 214, and mmWave TP 216.

When beam-forming is being used in communications, it is generally necessary to identify the communications beams (transmit beam, receive beam, or transmit and receive beams) that are oriented towards a device as much as possible since maximum energy is aligned in the orientation of the communications beams. If the communications beams are not properly aligned towards the device, the result may be sub-optimal. Therefore, it may be necessary for communicating devices to identify communications beams that yield the best performance. In other words, the communications devices may need to determine which communications beams are oriented in their direction. Such communications beams are referred to as best beams. It is noted that a situation may arise where there are no communications beams that are oriented directly towards a communications device. In such a situation, a communications beam that is oriented as closely as possible towards the communications device is the best beam. The shaded communications beams in FIG. 2 are the best beams for the respective devices (e.g., beams 230 and 232 for mmWave UE 229), while the light unshaded beams represent communications beams that are available communications beams but are not best beams for any device shown in FIG. 2. The communications beams shown in FIG. 2 transmit beams. Receive beams are similar to transmit beams, but are not shown in FIG. 2 in order to maintain simplicity.

Prior to communications between an mmWave eNB and an mmWave UE taking place, the mmWave UE has to obtain timing information associated with the mmWave eNB and become synchronized with the mmWave eNB. Furthermore, the communications beam directions for the mmWave eNB and the mmWave UE have to be determined. The determination of the communications beams is referred to as beam detection.

Traditional beam detection may involve beam training or blind detection, which may result in a large sounding overhead. As an illustrative example, in order to determine transmit beams of an mmWave eNB for a mmWave UE, the mmWave eNB has to transmit beam-formed reference signals over each of its plurality of transmit beams and the mmWave UE has to receive the beam-formed reference signals over each of its plurality of receive beams. Beam detection typically occurs after obtaining the timing information, which may also require the two devices to transmit or receive beam-formed reference signals using their respective communications beams.

Figure 3:
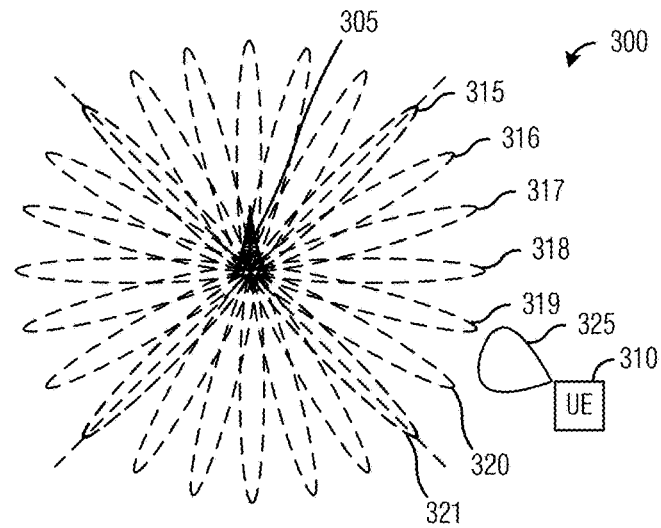
FIG. 3 illustrates a prior art technique for beam detection.

FIG. 3 illustrates a prior art technique 300 for beam detection. Prior art technique 300 includes mmWave eNB 305 transmitting beam-formed reference signals on a plurality of transmission beams, such as transmission beams 315-321. mmWave eNB 305 cycles through the plurality of transmission beams. As an illustrative example, in a first time interval, mmWave eNB 305 transmits a beam-formed reference signal on transmission beam 315, in a second time interval, mmWave eNB 305 transmits a beam-formed reference signal on transmission beam 316, and so on. An mmWave UE 310 similarly cycles through a plurality of receive beams, such as receive beam 325 to detect the transmitted beam-formed reference signals. In general, only the transmission beams oriented at least partially towards mmWave UE 310 will be detected by mmWave UE 310. Furthermore, only when mmWave UE 310 has a receive beam directed at least partly towards mmWave UE 310 are transmissions from mmWave eMB 305 detectable by mmWave UE 310.

According to an example embodiment, a technique for reducing time overhead involved in the initial attachment of a UE in a communications system utilizing beam-formed signals is provided. Initial attachment of a UE may involve the UE synchronizing with an eNB based on timing information derived from beam-formed reference signals transmitted by the eNB, the UE obtaining system information from the eNB based on beam-formed broadcast signals transmitted by the eNB, and the UE determining best beam pairs (best transmit beam from the eNB and best receive beam at the UE) for the UE-eNB.

According to an example embodiment, the eNB transmits beam-formed reference signals and beam-formed broadcast signals on multiple wide beams. Each of the wide beams is as wide as a plurality of narrow beams. As an illustrative example, each wide beam spans an entire sector of a coverage area of the eNB. The multiple wide beams provide coverage of the entire coverage area of the eNB. Therefore, the beam-formed reference signals and beam-formed broadcast signals fully cover the coverage area of the eNB, thereby simplifying the detection of the beam-formed reference signals and beam-formed broadcast signals by the UEs.

Figure 4A:
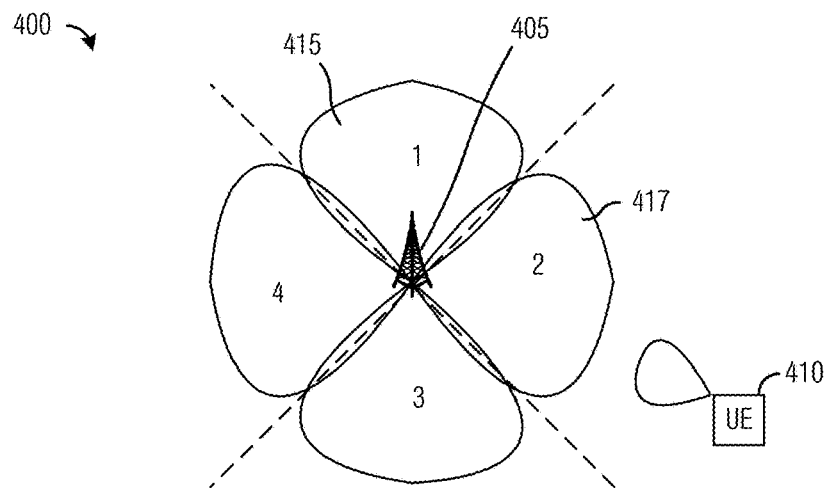
FIG. 4A illustrates a communications system highlighting the transmission of beam-formed reference signals and beam-formed broadcast signals on wide beams according to example embodiments described herein.

FIG. 4A illustrates a communications system 400 highlighting the transmission of beam-formed reference signals and beam-formed broadcast signals on wide beams. Communications system 400 includes an eNB 405 and a UE 410. Both eNB 405 and UE 410 use beam-forming. As shown in FIG. 4A, eNB 405 transmits beam-formed reference signals and beam-formed broadcast signals on wide beams, such as wide beam 415 and wide beam 417. Each wide beam spans an entirety of a sector of a coverage area of eNB 405. As an illustrative example, the coverage area of eNB 405 is divided into 4 sectors and each is covered by a single wide beam.

Since the entire coverage area of eNB 405 is covered by the beam-formed reference signals and beam-formed broadcast signals, UE 410 is able to detect the beam-formed reference signals and beam-formed broadcast signals at any time the beam-formed reference signals and beam-formed broadcast signals are transmitted as long as UE 410 has its own receive beam oriented towards (or substantially towards) eNB 405 and as long as UE 410 is close enough to eNB 405 so that the signal strength of the beam-formed reference signals and beam-formed broadcast signals is high enough to be detected.

It is noted that the four wide beams shown in FIG. 4A and discussed herein are for illustrative purposes only. The example embodiments presented herein are operable with other numbers of wide beams, such as 2, 3, 5, 6, 7, 8, and so on. Therefore, the illustration and discussion of four wide beams should not be construed as being limiting to the scope or spirit of the example embodiments.

Contrasted with the prior art technique for transmitting beam-formed reference signals and beam-formed broadcast signals shown in FIG. 3, where a UE is usually not able to detect the beam-formed reference signals and beam-formed broadcast signals until there is a transmit beam oriented towards the UE, the wide beam technique shown in FIG. 4A can significantly reduce the time overhead involved in initial attachment since the UE does not have to wait until a transmit beam is oriented towards the UE.

According to an example embodiment, the beam-formed reference signals and beam-formed broadcast signals are transmitted using wide beams, but beam-formed data transmissions are transmitted using narrow beams. After initial attachment is complete, data transmissions between the UE and the eNB are also beam-formed, but they are transmitted using narrow beams. The narrow beams may be selected in accordance with the best beam pairs indicated by the UE during initial attachment, for example.

Figure 4B:
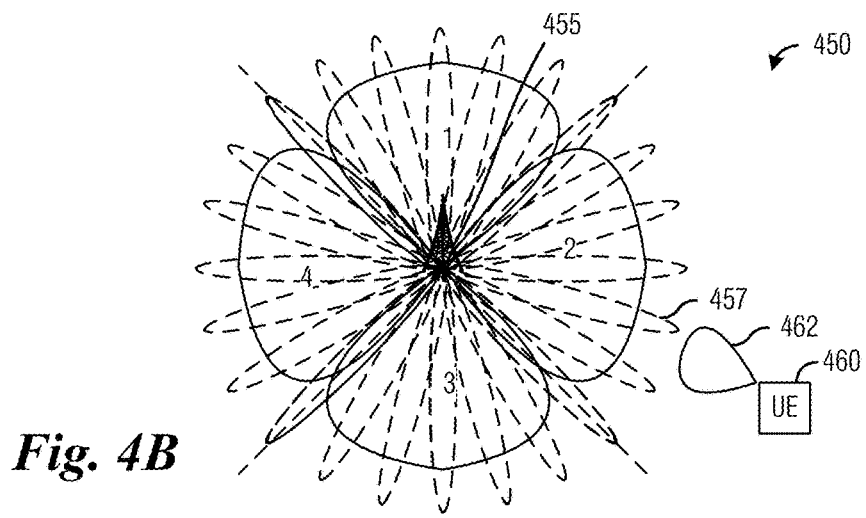
FIG. 4B illustrates a communications system highlighting the transmission of beam-formed reference signals and beam-formed broadcast signals on wide beams and the transmission of beam-formed data on narrow beams according to example embodiments described herein.

FIG. 4B illustrates a communications system 450 highlighting the transmission of beam-formed reference signals and beam-formed broadcast signals on wide beams and the transmission of beam-formed data on narrow beams. Communications system 450 includes an eNB 455 and a UE 460. Both eNB 455 and UE 460 use beam-forming. As shown in FIG. 4B, eNB 455 transmits beam-formed reference signals and beam-formed broadcast signals on wide beams. However, beam-formed data is communicated using narrow beams. As an illustrative example, beam-formed data is transmitted to UE 460 on narrow beam 457 and received by UE 460 on receive beam 462. It is noted that the number of narrow beams (24) shown in FIG. 4B is for illustrative purposes only and that the example embodiments presented herein are operable with any number of narrow beams.

According to an example embodiment, the wide beams carrying the beam-formed reference signals and beam-formed broadcast signals are rotated. The wide beams are rotated by a fixed amount each time they are transmitted by the eNB. As an illustrative example, the wide beams are rotated by an amount equal to a width of a narrow beam each time they are transmitted. In other words, the wide beams are rotated the same number of degrees as the beam-width of each of the narrow beams. The rotation of the wide beams does not have an impact on the detection of the beam-formed reference signals and beam-formed broadcast signals by the UE. However, the rotation of the wide beams helps the UE in the determination of a best beam pair for the eNB and the UE.

Figure 5A:
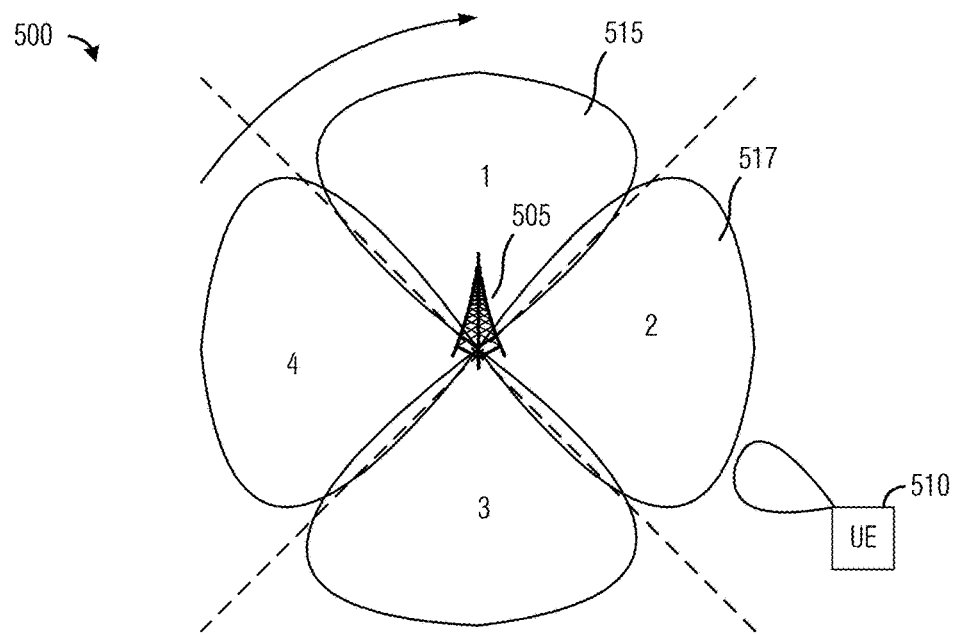
FIG. 5A illustrates a communications system highlighting beam-formed reference signals and beam-formed broadcast signals transmitted on wide beams according to example embodiments described herein.

FIG. 5A illustrates a communications system 500 highlighting beam-formed reference signals and beam-formed broadcast signals transmitted on wide beams. Communications system 500 includes an eNB 505 and a UE 510. eNB 505 transmits the beam-formed reference signals and beam-formed broadcast signals on wide beams, such as wide beam 515 and wide beam 517. As discussed previously, the 4 wide beams shown in FIG. 5A are for illustrative purposes and are not intended to limit the scope or the spirit of the example embodiments.

Figure 5B:
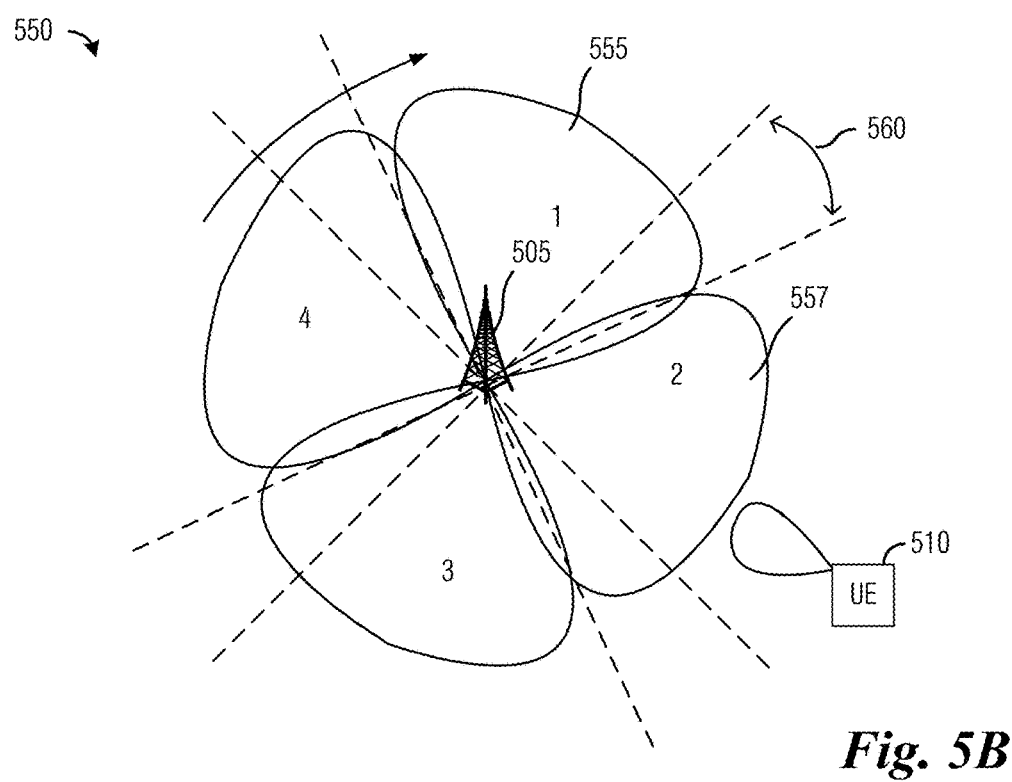
FIG. 5B illustrates a view of communications system highlighting an example rotation of the wide beams transmitting the beam-formed reference signals and beam-formed broadcast signals according to example embodiments described herein.

FIG. 5B illustrates a view 550 of communications system 500 highlighting an example rotation of the wide beams transmitting the beam-formed reference signals and beam-formed broadcast signals. After transmitting the beam-formed reference signals and beam-formed broadcast signals on wide beams at a first time interval, such as shown in FIG. 5A, eNB 505 rotates the wide beams to produce new wide beams. The rotation of the wide beams is equal to the beam-width of a narrow beam, for example. eNB 505 transmits the beam-formed reference signals and beam-formed broadcast signals using the new wide beams. As shown in FIG. 5B, the new wide beams include new wide beam 555 and new wide beam 557. Arc 560 represents the rotation of the wide beams shown in FIG. 5A compared to the new wide beams shown in FIG. 5B. As shown in FIG. 5B, UE 510 is still able to receive the beam-formed reference signals and beam-formed broadcast signals when they are transmitted using the new wide beams.

Figure 5C:
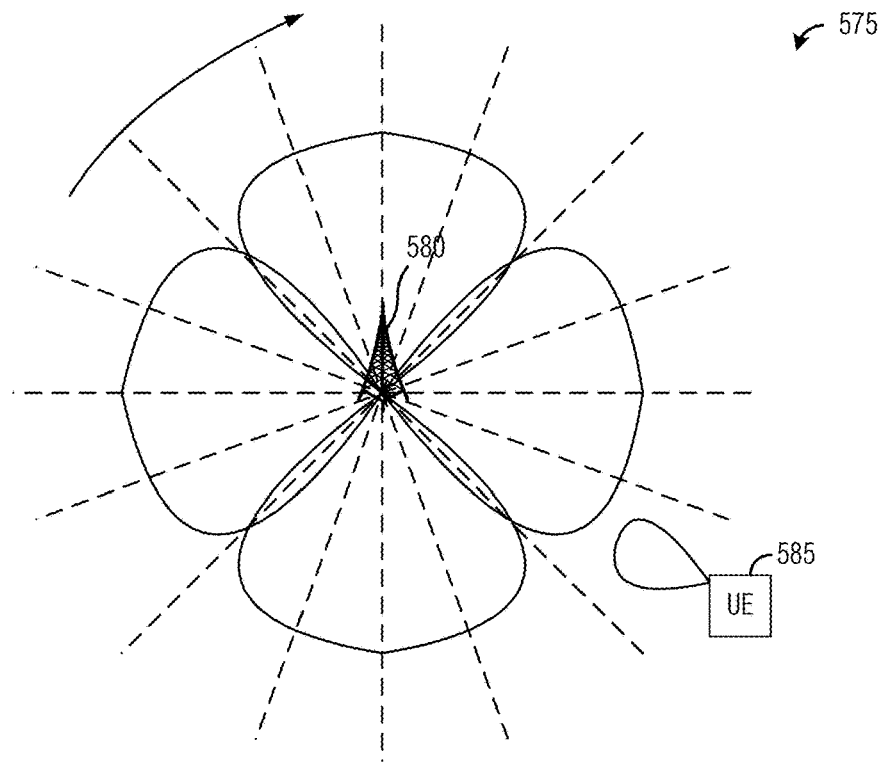
FIG. 5C illustrates a communications system highlighting example rotations of wide beams according to example embodiments described herein.

FIG. 5C illustrates a communications system 575 highlighting example rotations of wide beams. Communications system 575 includes an eNB 580 serving a UE 585. eNB 580 transmits wide beams conveying beam-formed reference signals and beam-formed broadcast signals. After transmitting the wide beams for a specified instance, such as a time slot, eNB 580 rotates the wide beams prior to transmitting the wide beams with the beam-formed reference signals and beam-formed broadcast signals in another specified instance. The rotation and the transmission continue during normal operations.

Figures 6, 7:
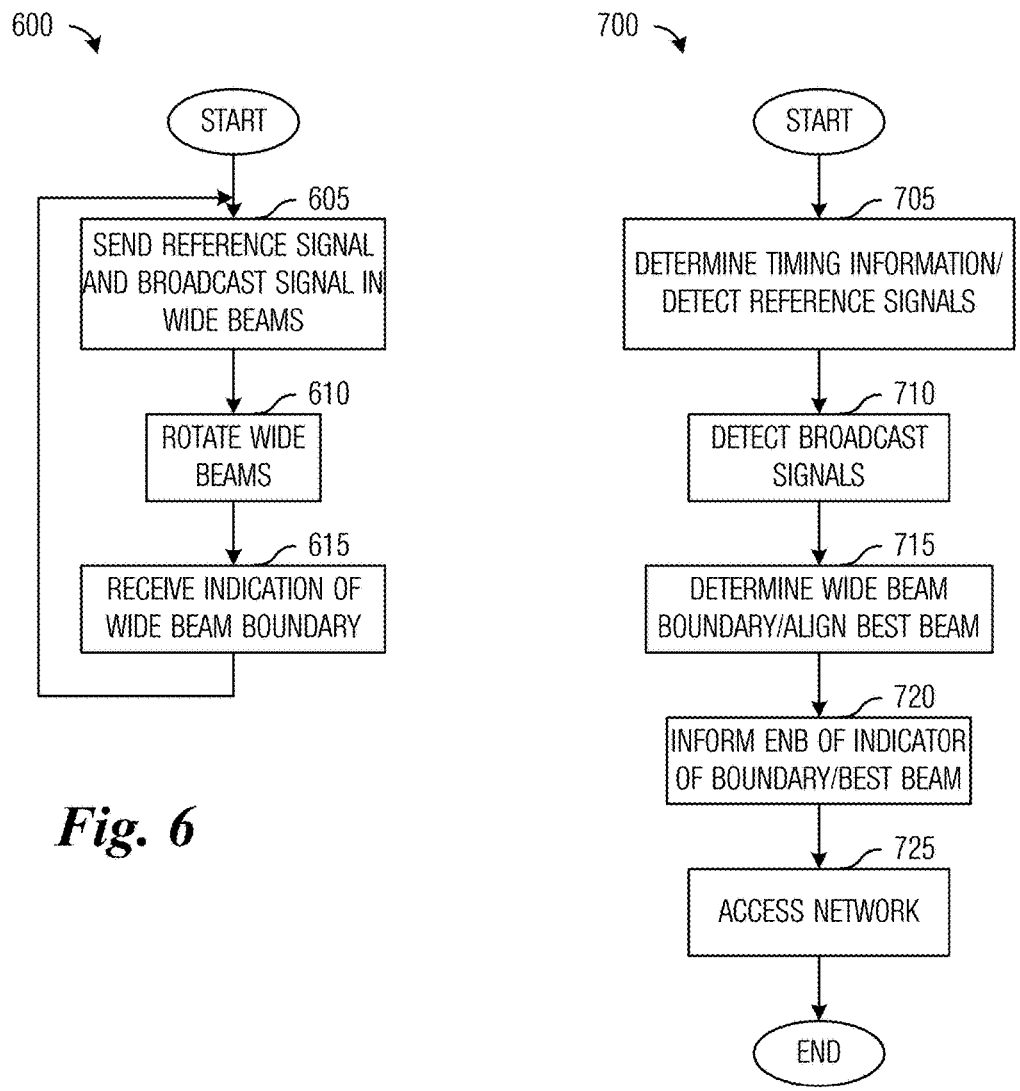
FIG. 6 illustrates a flow diagram of example operations occurring in an eNB transmitting beam-formed reference signals and beam-formed broadcast signals using wide beams according to example embodiments described herein.
FIG. 7 illustrates a flow diagram of example operations occurring in a UE operating in a communications system with beam-formed reference signals and beam-formed broadcast signals on wide beams according to example embodiments described herein.

FIG. 6 illustrates a flow diagram of example operations 600 occurring in an eNB transmitting beam-formed reference signals and beam-formed broadcast signals using wide beams. Operations 600 may be indicative of operations occurring in an eNB, such as an mmWave eNB, transmitting beam-formed reference signals and beam-formed broadcast signals using wide beams. The wide beams provide full coverage of the coverage area of the eNB.

Operations 600 begin with the eNB sending beam-formed reference signals and beam-formed broadcast signals using wide beams (block 605). The eNB sends beam-formed reference signals (e.g., primary synchronization signals (PSS) and/or secondary synchronization signals (SSS)) and beam-formed broadcast signals (e.g., broadcast channel (BCH), physical broadcast channel (PBCH), and so on) using the wide beams. The sending of the beam-formed reference signals and beam-formed broadcast signals using wide beams may include beam-forming the reference signals and the beam-formed broadcast signals with corresponding wide beams and transmitting beam-formed reference signals and beam-formed broadcast signals. The use of longer reference signals or broadcast signals and/or using sequence repetition in the time and/or frequency domains help to improve the link budget. The repetition of the reference signals and/or broadcast signals may also compensate for less antenna gain due to beam-forming with wide beams since less energy is directed towards the UE.

Each wide beam may be identified using different reference signals. Alternatively, the same reference signal may be used for each wide beam, but different scrambling masks may be used for each wide beam. The different reference signals and/or different scrambling masks may be specified by a technical standard or by an operator of the communications system to ensure that both the eNB and the UE know the reference signals and/or scrambling masks being used. In a situation wherein both PSS and SSS are used as reference signals, the same SSS may be used in all wide beams, with or without different scrambling codes. The timing of the reference signals may be aligned in all wide beams.

The broadcast signals may include system information (SI) that can be decoded by the UEs. The SI may include information used to support communications. Examples of the information in the SI include: a beam detection threshold used by the UE to determine boundaries of wide beams (an example determination of the boundaries of wide beams is presented in detail below); a time offset between a wide beam boundary and a narrow receiver beam designated for random access; and so forth. The timing of broadcast signals should be aligned in all downlink wide beams. The SI may also be transmitted in an alternate method, such as by a legacy macro eNB, for example.

The eNB rotates the wide beams (block 610). Prior to sending the beam-formed reference signals and beam-formed broadcast signals, the eNB rotates the wide beams. As an illustrative example, the rotation of the wide beams may be equal to a beam-width of a narrow beam. However, other rotation amounts may be used. As an illustrative example, consider a situation wherein 3GPP LTE frame structure is used. In 3GPP LTE, the PSS and/or SSS is transmitted every 5 milliseconds and the PBCH is transmitted every 10 milliseconds. The eNB may rotate the wide beams every 5 milliseconds and only need to use the wide beams when there is a PSS and/or SSS and PBCH transmission. It is noted that faster (more frequent) PSS and/or SSS and PBCH transmissions may be used to support faster initial attachment (more rapid synchronization and best beam pair detection).

The eNB receives an indication of a wide beam boundary (block 615). The indication of the wide beam boundary may be from the UE but relayed by a macro eNB because a link between the UE and the eNB does not exist. The indication may be in the form of a time slot corresponding to when the UE was able to detect the wide beam boundary. The time slot may be in reference to a system timing (e.g., frame boundary, sub-frame boundary, etc.) associated with when the UE became synchronized with the eNB. The eNB returns to block 605 to send the beam-formed reference signals and beam-formed broadcast signals. Alternatively, instead of reporting the relative timing to a macro eNB that will relay the report to the eNB, UE can perform a random access procedure with the eNB along the wide beam boundary. A detailed description of the random access procedure with the eNB is described below from UE's perspective.

FIG. 7 illustrates a flow diagram of example operations 700 occurring in a UE operating in a communications system with beam-formed reference signals and beam-formed broadcast signals on wide beams. Operations 700 may be indicative of operations occurring in a UE, such as an mmWave UE, operating in a communications system with beam-formed reference signals and beam-formed broadcast signals on wide beams.

Operations 700 begin with the UE determining timing information of the eNB (block 705). The UE may determine the timing information of the eNB by detecting reference signals transmitted by the eNB. The reference signals, e.g., PSS and/or SSS, may be beam-formed by wide beams that are wider than a plurality of narrow beams. Since the beam-formed reference signals provide full coverage of the coverage area of the eNB, the UE may be able to quickly detect the reference signals (once the UE has a receive beam oriented towards the eNB, for example) instead of having to wait for the eNB to orient a narrow beam carrying beam-formed reference signals towards the UE.

The UE detects beam-formed broadcast signals (block 710). After the UE determines the timing information of the eNB, it may detect beam-formed broadcast signals. The beam-formed broadcast signals may be sent simultaneously with the beam-formed reference signals. The UE may determine SI from the beam-formed broadcast signals. Examples of the information in the SI include: a beam detection threshold used by the UE to determine boundaries of wide beams (an example determination of the boundaries of wide beams is presented in detail below); a time offset between a wide beam boundary and a narrow receiver beam designated for random access; and so forth.

The UE determines a wide beam boundary (block 715). The UE may determine the boundary between two adjacent wide beams by comparing received signal strengths for the two adjacent wide beams, for example. The boundary of the two adjacent wide beams may correspond to a narrow beam that is best oriented towards the UE. In other words, the boundary of the two adjacent wide beams may correspond to the best narrow beam for the UE.

Figure 8:
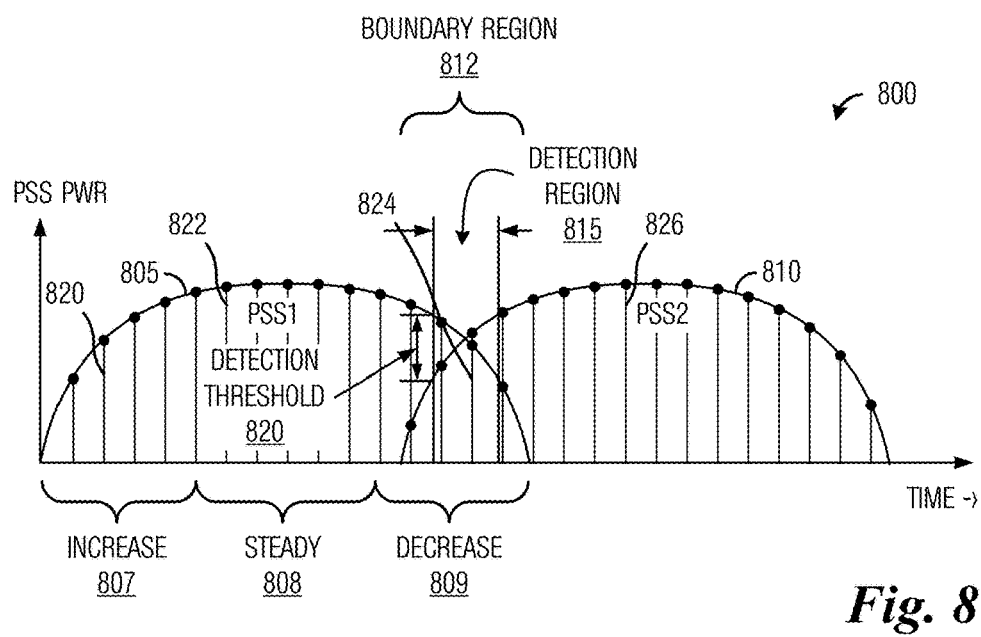
FIG. 8 illustrates a diagram highlighting an example technique for detecting the boundary between two adjacent wide beams according to example embodiments described herein.

FIG. 8 illustrates a diagram 800 highlighting an example technique for detecting the boundary between two adjacent wide beams. Diagram 800 illustrates the received signal strength for two beam-formed reference signals, PSS1 805 and PSS2 810, as a function of time. Usually, as a wide beam is rotated while the UE remains relatively steady, the received signal strength for a reference signal carried in the wide beam will increase as the wide beam is initially oriented towards the UE (shown as increase interval 807), level off as the wide beam becomes fully oriented towards the UE (shown as steady interval 808), and then decrease as the wide beam begins to be directed away from the UE (shown as decrease interval 809). It is noted that diagram 800 displays continuous time in the X-axis. However, since the rotation of the wide beams occurs in discrete steps, e.g., beam-widths of the narrow beams, the actual received signal strengths of the beam-formed reference signals will also be discrete and appear as samples of the received signal strength curves shown in FIG. 8, such as samples 820, 822, 824, and 826.

It is noted that within a boundary region between two adjacent wide beams, the received signal strength for a first beam-formed reference signal in a first wide beam is decreasing and the received signal strength for a second beam-formed reference signal in a second wide beam is increasing. As an example, such a boundary region occurs for PSS1 805 and PSS2 810 in boundary region 812. Initially, the received signal strength for the first beam-formed reference signal, e.g., PSS1 805, is high and the received signal strength for the second beam-formed reference signal, e.g., PSS2 810, is low. However, as the wide beams continue to rotate, the the received signal strength for the first beam-formed reference signal drops while the the received signal strength for the second beam-formed reference signal increases, and eventually become approximately equal. Finally, the received signal strength for the first beam-formed reference signal is low and the received signal strength for the second beam-formed reference signal is high. Therefore, the received signal strengths for the two beam-formed reference signals are approximately equal when the boundary between the two adjacent wide beams occurs. Since rotation of the wide beams occurs in discrete steps, the UE may not be in the exact position required for the received signal strengths of the two beam-formed reference signals are approximately equal; therefore, a detection threshold 820 is defined to permit the determination of the boundary without having to require that the received signal strengths for the two beam-formed reference signals to be approximately equal. The use of detection threshold 820 results in a detection region 820 where the UE may be within any part of detection region 820 and still determine the presence of the boundary. The value of detection threshold 820 may be specified in a technical standard or by an operator of the communications system.

In order to identify the wide beam boundaries, neighboring wide beams of one cell need to be distinguishable from one another. One way to achieve this is to use different reference signals. A reference signal pattern across all wide beams of one cell can be predefined in a technical standard or by an operator of the communications system and thus be commonly known to eNBs and UEs. Furthermore, in multi-cell scenario, neighboring cells should use different sets of reference signals to avoid possible ambiguity in wide beam boundary detection. The different sets of reference signals may also be predefined in a technical standard or by an operator of the communications system.

Referring back now to FIG. 7, the UE informs the eNB of an indicator of the wide beam boundary (block 720). The indicator may indicate a time slot corresponding to when the UE was able to detect the wide beam boundary. Alternatively, the indicator may indicate a time offset or difference from when the UE was able to detect the wide beam boundary and when the UE synchronized with the eNB. Because no connection exists between eNB and UE yet, informing the eNB of the indicator may involve sending the indicator to a macro eNB, which will relay the indicator to the eNB. Alternatively, the UE may perform a random access procedure with the eNB. The random access procedure to signal the indicator to the eNB may include the UE selecting a random access preamble and sending the random access preamble to the eNB. The eNB may respond back with a resource allocation that would allow the UE to signal the indicator to the eNB.

The UE accesses the communications system (block 725). As an illustrative example, the UE performs a random access procedure to obtain access to the communications system. The random access procedure may include the UE selecting a random access preamble and sending the random access preamble to the eNB. The eNB may respond back with a resource allocation, permitting the UE to communicate.

Figure 9:
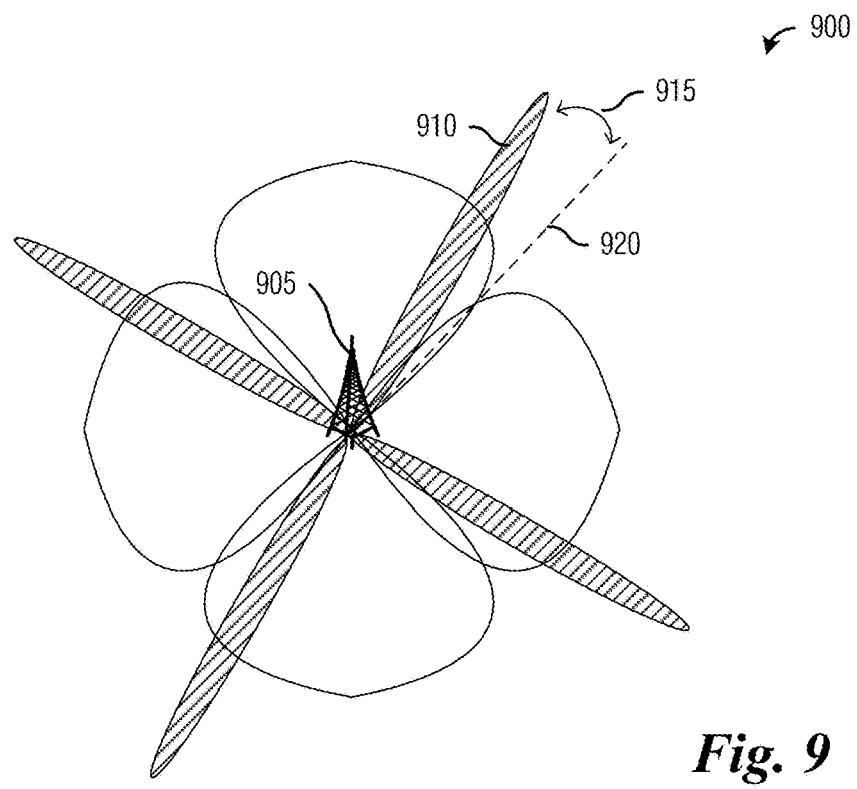
FIG. 9 illustrates a communications system highlighting narrow receive beams supporting random access procedures according to example embodiments described herein.

According to an example embodiment, the eNB configures narrow receive beams to follow wide beam boundaries to improve random access procedure performance. The narrow receive beams follow the wide beam boundaries by a specified amount of time (i.e., a delay), which may be specified in the SI included in the beam-formed broadcast signals, and improve the random access procedure performance by improving the receive capability of the eNB. FIG. 9 illustrates a communications system 900 highlighting narrow receive beams supporting random access procedures. As shown in FIG. 9, an eNB 905 configures narrow receive beams, such as narrow receive beam 910, a specified amount of time or a specified number of degrees, such as span 915, after wide beam boundaries, such as wide beam boundary 920. According to an example embodiment, there is at least one narrow receive beam per wide beam boundary.

The UE may be able to determine a time slot corresponding to the delay associated with the narrow receive beam and initiate the random access procedure in the time slot. If the eNB is successful in receiving the random access preamble from the UE, the random access procedure continues using communications beams oriented in the beam direction of the narrow receive beam.

Figure 10:
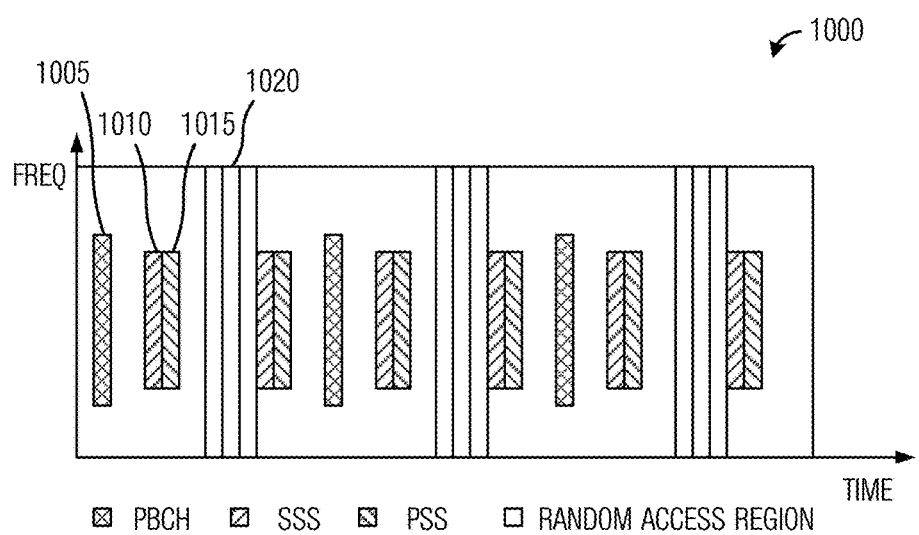
FIG. 10 illustrates example network resources according to example embodiments described herein.

FIG. 10 illustrates example network resources 1000. In order to support random access by the UE where the UE transmits a random access preamble to the eNB (commonly referred to as direct random access), orthogonal network resources may need to be assigned for downlink wide beams (PBCH, PSS, and SSS) and uplink narrow beams (PRACH). Network resources 1000 includes orthogonal network resources allocated for beam-formed broadcast signals 1005 (e.g., PBCH), network resources allocated for beam-formed reference signals (e.g., SSS 1010 and PSS 1015), as well as network resources allocated for random access 1020. It is noted that for eNBs with advanced self-interference cancellation capability, the requirement of orthogonal network resources may be relaxed.

Figure 11:
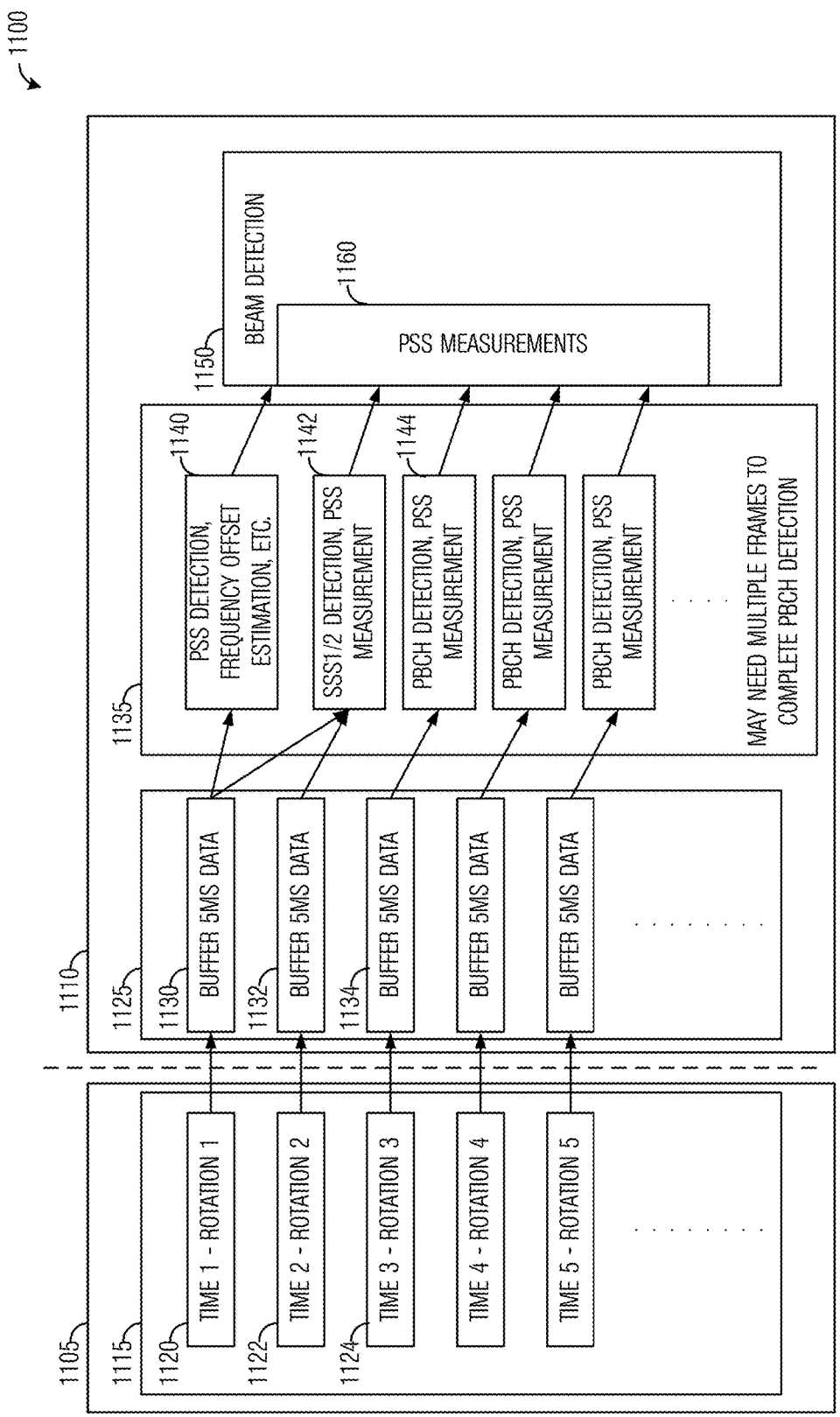
FIG. 11 illustrates a block diagram of an eNB-UE communicating pair according to example embodiments described herein.

FIG. 11 illustrates a block diagram of an eNB-UE communicating pair 1100. Communicating pair 1100 includes an eNB 1105 and a UE 1110. A transmitter 1115 in eNB 1105 transmits beam-formed reference signals and beam-formed broadcast signals. As an example, at a first time (block 1120), transmitter 1115 transmits the beam-formed reference signals and beam-formed broadcast signals at a first rotation, at a second time (block 1122), transmitter 1115 transmits the beam-formed reference signals and beam-formed broadcast signals at a second rotation, at a third time (block 1124), transmitter 1115 transmits the beam-formed reference signals and beam-formed broadcast signals at a third rotation, and so on.

A buffer (or memory) 1125 at UE 1110 is used to buffer the received beam-formed reference signals and beam-formed broadcast signals. As an example, buffer 1125 stores data corresponding to the first time in location 1130, data corresponding to the second time in location 1132, data corresponding to the third time in location 1134, and so forth. Detectors 1135 in UE 1110 correlate the data stored in buffer 1125 to detect the beam-formed signals, e.g., PSS, SSS, as well as the beam-formed broadcast signals after acquiring the timing, e.g., PBCH. As an example, detector 1140 performs PSS detection, as well as timing information detection (e.g., frequency offset estimation, and so on), while detector 1142 performs SSS detection, PSS measurement, and so on and detector 1144 performs PBCH detection, PSS measurement, and so on. Outputs of detectors 1135 are provided to beam detection unit 1150 which may use the outputs to determine the boundary of adjacent wide beams. A PSS measurements unit 1160 may be used to compare the received signal strengths of the received reference signals to determine the wide beam boundaries. Since the data corresponding to the different times are stored in memory 1125, the time slot or time offset corresponding to the wide beam boundary is readily determined.

According to an example embodiment, the best beam determined in accordance with the wide beam boundary serves as a starting point for beam tracking. The best beam determined with the wide beam boundary may be used as a starting point for beam tracking, which continues with the UE continuing to monitor the beam-formed reference signals and the beam-formed broadcast signals. The continued monitoring may occur using all of the receive beams of the UE. Any new wide beam boundaries detected by the UE can be identified as described above and can be used to fine tune the best beam. As an illustrative example, multiple wide beam boundaries can be compared to fine tune the best beam. As another illustrative example, multiple wide beam boundaries can be compared to fine tune the best beam, but greater weight is applied to the more recently found wide beam boundaries.

Alternatively, the best beam determined with the wide beam boundary may be used to reduce a search space for beam-formed channel state information reference signal (CSI-RS) based beam tracking techniques. As an illustrative example, the search space for the beam-formed CSI-RS based beam tracking techniques may be reduced to the orientation determined by the wide beam boundary plus or minus a fraction of the beam-width of a narrow beam.

Figure 12:
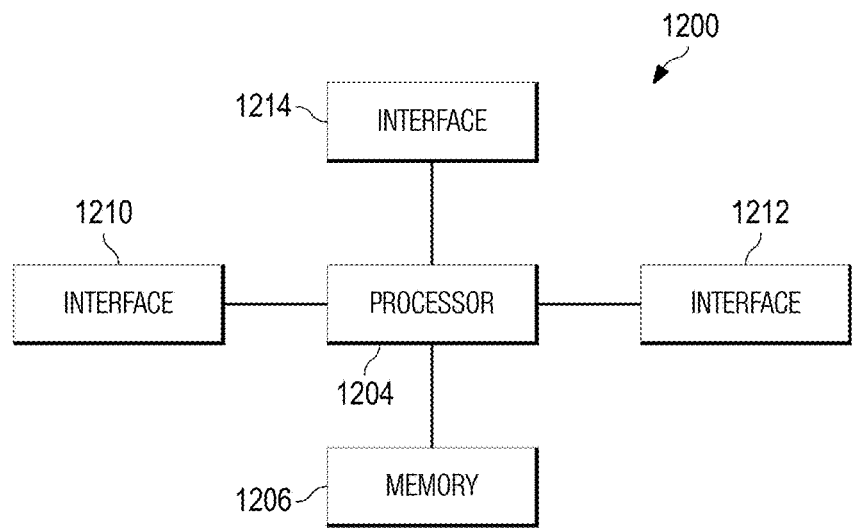
FIG. 12 illustrates a block diagram of an embodiment processing system for performing methods described herein.

FIG. 12 illustrates a block diagram of an embodiment processing system 1200 for performing methods described herein, which may be installed in a host device. As shown, the processing system 1200 includes a processor 1204, a memory 1206, and interfaces 1210-1214, which may (or may not) be arranged as shown in FIG. 12. The processor 1204 may be any component or collection of components adapted to perform computations and/or other processing related tasks, and the memory 1206 may be any component or collection of components adapted to store programming and/or instructions for execution by the processor 1204. In an embodiment, the memory 1206 includes a non-transitory computer readable medium. The interfaces 1210, 1212, 1214 may be any component or collection of components that allow the processing system 1200 to communicate with other devices/components and/or a user. For example, one or more of the interfaces 1210, 1212, 1214 may be adapted to communicate data, control, or management messages from the processor 1204 to applications installed on the host device and/or a remote device. As another example, one or more of the interfaces 1210, 1212, 1214 may be adapted to allow a user or user device (e.g., personal computer (PC), etc.) to interact/communicate with the processing system 1200. The processing system 1200 may include additional components not depicted in FIG. 12, such as long term storage (e.g., non-volatile memory, etc.).

In some embodiments, the processing system 1200 is included in a network device that is accessing, or part otherwise of, a telecommunications network. In one example, the processing system 1200 is in a network-side device in a wireless or wireline telecommunications network, such as a base station, a relay station, a scheduler, a controller, a gateway, a router, an applications server, or any other device in the telecommunications network. In other embodiments, the processing system 1200 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 13:
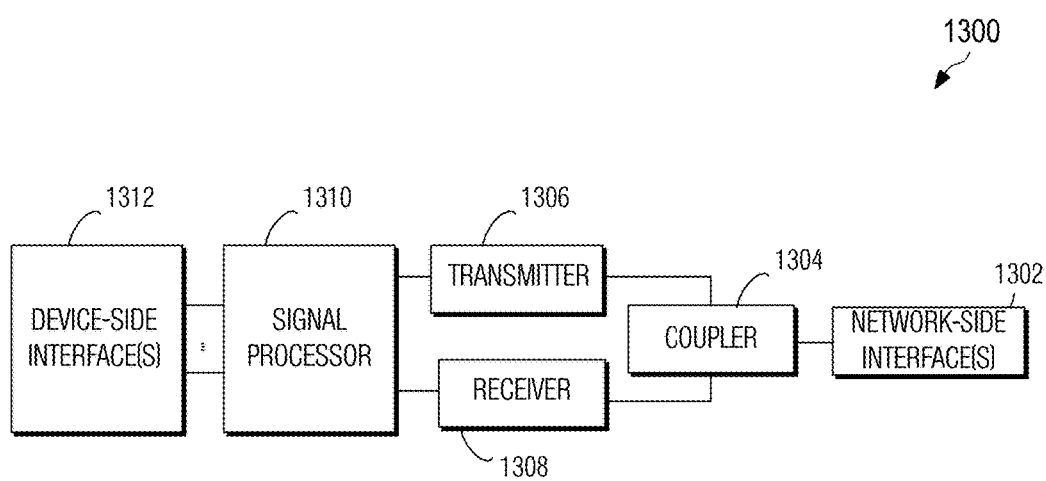
FIG. 13 illustrates a block diagram of a transceiver adapted to transmit and receive signaling over a telecommunications network according to example embodiments described herein.

In some embodiments, one or more of the interfaces 1210, 1212, 1214 connects the processing system 1200 to a transceiver adapted to transmit and receive signaling over the telecommunications network. FIG. 13 illustrates a block diagram of a transceiver 1300 adapted to transmit and receive signaling over a telecommunications network. The transceiver 1300 may be installed in a host device. As shown, the transceiver 1300 comprises a network-side interface 1302, a coupler 1304, a transmitter 1306, a receiver 1308, a signal processor 1310, and a device-side interface 1312. The network-side interface 1302 may include any component or collection of components adapted to transmit or receive signaling over a wireless or wireline telecommunications network. The coupler 1304 may include any component or collection of components adapted to facilitate bi-directional communication over the network-side interface 1302. The transmitter 1306 may include any component or collection of components (e.g., up-converter, power amplifier, etc.) adapted to convert a baseband signal into a modulated carrier signal suitable for transmission over the network-side interface 1302. The receiver 1308 may include any component or collection of components (e.g., down-converter, low noise amplifier, etc.) adapted to convert a carrier signal received over the network-side interface 1302 into a baseband signal. The signal processor 1310 may include any component or collection of components adapted to convert a baseband signal into a data signal suitable for communication over the device-side interface(s) 1312, or vice-versa. The device-side interface(s) 1312 may include any component or collection of components adapted to communicate data-signals between the signal processor 1310 and components within the host device (e.g., the processing system 1200, local area network (LAN) ports, etc.).

The transceiver 1300 may transmit and receive signaling over any type of communications medium. In some embodiments, the transceiver 1300 transmits and receives signaling over a wireless medium. For example, the transceiver 1300 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1302 comprises one or more antenna/radiating elements. For example, the network-side interface 1302 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1300 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a detecting unit/module, a listening unit/module, an identifying unit/module, a determining unit/module, a selecting unit/module, and/or a beam-forming unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method implemented by a user equipment (UE) in a millimeter wave (mmWave) communications system, the method comprising:
   receiving, by the UE, a first wide beam beam-formed reference signal from a mmWave evolved NodeB (eNB) during an initial time interval, the first wide beam beam-formed reference signal carrying timing information;
   simultaneously receiving during a subsequent time interval, both the first wide beam beam-formed reference signal and a second wide beam beam-formed reference signal, the first wide beam beam-formed reference signal and the second wide beam beam-formed reference signal each being rotated by a narrow beam beam-width one or more times since the initial time interval;
   detecting, by the UE, a wide beam spatial boundary between the first wide beam beam-formed reference signal and the second wide beam beam-formed reference signal received during the subsequent time interval; and
   informing, by the UE, the mmWave eNB that the UE detected the wide beam spatial boundary, during the subsequent time interval.

2. The method of claim 1, wherein detecting the wide beam spatial boundary during the subsequent time interval comprises:
   listening, by the UE, for other wide beam reference signals during time intervals following the initial time interval while the UE continues to detect the first wide beam beam-formed reference signal during the time intervals following the initial time interval; and
   identifying, by the UE, the wide beam spatial boundary when both the first wide beam beam-formed reference signal and the second wide beam beam-formed reference signal are detected during the same time interval and when a difference between received signal strengths of the first wide beam beam-formed reference signal and the second wide beam beam-formed reference signal is less than a specified threshold.

3. The method of claim 1, further comprising:
receiving, by the UE, wide beam beam-formed broadcast signals during time intervals following the initial time interval while the UE continues to detect the first wide beam beam-formed reference signal during the time intervals following the initial time interval; and
determining, by the UE, system information (SI) in accordance with the wide beam beam-formed broadcast signals.

4. The method of claim 3, wherein the SI comprises at least one of a specified threshold for a difference between received signal strengths of the first wide beam beamformed reference signal and the second wide beam beamformed reference signal, a delay between the wide beam spatial boundary and a narrow receiver beam indicated by the mmWave eNB, and a timing for the wide beam beamformed broadcast signals.

5. The method of claim 1, wherein the informing comprises sending a time slot corresponding to the subsequent time interval to the mmWave eNB.

6. The method of claim 1, further comprising initiating, by the UE, a random access procedure with the mmWave eNB.

7. The method of claim 6, wherein initiating the random access procedure comprises:
selecting, by the UE, a random access preamble;
determining, by the UE, a transmit time interval in accordance with a delay between the wide beam spatial boundary and a narrow receiver beam indicated by the mmWave eNB; and
transmitting, by the UE, the random access preamble in the transmit time interval.

8. The method of claim 7, wherein the delay is received in wide beam beam-formed broadcast signals.

9. The method of claim 6, wherein initiating the random access procedure comprises:
informing, a legacy eNB by the UE, that the UE detected the wide beam spatial boundary during the subsequent time interval, thereby triggering a coordination of the random access procedure.

10. The method of claim 1, wherein the first wide beam beam-formed reference signal comprises a primary synchronization signal (PSS).

11. The method of claim 10, wherein each wide beam beam-formed reference signal comprises one of a different reference signal or the same reference signal scrambled with different scrambling masks.

12. The method of claim 10, wherein the first wide beam beam-formed reference signal and the second wide beam beam-formed reference signal further comprise a secondary synchronization signal (SSS).

13. The method of claim 1, wherein informing the mmWave eNB comprises sending an indication of the wide beam spatial boundary to a macro eNB prompting the macro eNB to relay the indication to the mmWave eNB.

14. The method of claim 1, wherein informing the mmWave eNB comprises initiating a random access procedure with the mmWave eNB to obtain a resource allocation to signal an indication of the wide beam spatial boundary to the mmWave eNB.

15. The method of claim 1, the informing being used to assign a narrow beam direction to the UE.

16. A method implemented by an evolved NodeB (eNB) in a millimeter wave (mmWave) communications system, the method comprising:
beam-forming, by the eNB, reference signals and broadcast signals with a plurality of wide beams, thereby producing a plurality of wide beam beam-formed reference and broadcast signals, the plurality of wide beams providing coverage of a full coverage area of the eNB;
simultaneously transmitting, by the eNB, the plurality of wide beam beam-formed reference and broadcast signals in an initial time interval;
simultaneously transmitting, by the eNB, rotated versions of the plurality of wide beam beam-formed reference and broadcast signals in subsequent time intervals, the plurality of wide beam beam-formed reference and broadcast signals rotated by a narrow beam beam-width during each subsequent time interval; and
receiving, by the eNB, an indication of a wide beam spatial boundary between two adjacent wide beam beam-formed reference and broadcast signals of the plurality of wide beam beam-formed reference and broadcast signals, from a user equipment (UE).

17. The method of claim 16, further comprising assigning, by the eNB, a narrow beam direction to the UE in accordance with the indication of the wide beam spatial boundary.

18. The method of claim 16, further comprising receiving, by the eNB, a random access preamble in a narrow receiver beam, the random access preamble initiating a random access procedure.

19. A user equipment (UE) adapted to operate in a millimeter wave (mmWave) communications system, the UE comprising:
a non-transitory memory storage comprising instructions; and
processor in communication with the memory storage, wherein the processor executes the instructions to:
receive a first wide beam beam-formed reference signal from a mmWave evolved NodeB (eNB) during an initial time interval, the first wide beam beam-formed reference signal carrying timing information,
simultaneously receive during a subsequent time interval, both the first wide beam beam-formed reference signal and a second wide beam beam-formed reference signal, the first wide beam beam-formed reference signal and the second wide beam beam-formed reference signal each being rotated by a narrow beam beam-width one or more times since the initial time interval;
detect a wide beam spatial boundary between the first wide beam beam-formed reference signal and the second wide beam beam-formed reference signal received during the subsequent time interval, and
inform the mmWave eNB that the UE detected the wide beam spatial boundary, during the subsequent time interval.

20. The UE of claim 19, wherein the processor executes the instructions to listen for other wide beam reference signals during time intervals following the initial time interval while the UE continues to detect the first wide beam beam-formed reference signal during the time intervals following the initial time interval, and identify the wide beam spatial boundary when both the first wide beam beam-formed reference signal and the second wide beam beam-formed reference signal are detected during the same time interval and when a difference between received signal strengths of the first wide beam beam-formed reference signal and the second wide beam beam-formed reference signal is less than a specified threshold.

21. The UE of claim 19, wherein the processor executes the instructions to receive wide beam beam-formed broadcast signals during time intervals following the initial time interval while the UE continues to detect the first wide beam beam-formed reference signal during the time intervals following the initial time interval, and determine system information (SI) in accordance with the wide beam beam-formed broadcast signals.

22. The UE of claim 19, wherein the processor executes the instructions to select a random access preamble, determine a transmit time interval in accordance with a delay between the wide beam spatial boundary and a narrow receiver beam indicated by the mmWave eNB, and transmit the random access preamble in the transmit time interval.

23. The UE of claim 19, wherein the processor executes the instructions to inform a macro eNB that the UE detected the wide beam spatial boundary, thereby prompting the macro eNB to relay an indication of the detection to the mmWave eNB.

24. The UE of claim 19, wherein the processor executes the instructions to initiate a random access procedure with the mmWave eNB to obtain a resource allocation to inform the mmWave eNB that the UE detected the wide beam spatial boundary.

25. The UE of claim 19, wherein the processor executing the instructions to inform the mmWave eNB comprise instructions to send a time slot corresponding to the subsequent time interval to the mmWave eNB.

26. The UE of claim 19, wherein the processor executes the instructions to initiate a random access procedure with the mmWave eNB.

27. The UE of claim 19, the informing being used to assign a narrow beam direction to the UE.

28. An evolved NodeB (eNB) adapted to operate in a millimeter wave (mmWave) communications system, the eNB comprising:

a non-transitory memory storage comprising instructions; and
a processor in communication with the memory storage, wherein the processor executes the instructions to:
beam-form reference signals and broadcast signals with a plurality of wide beams, thereby producing a plurality of wide beam beam-formed reference and broadcast signals, wherein the plurality of wide beams provide coverage of a full coverage area of the eNB,
simultaneously transmit the plurality of wide beam beam-formed reference and broadcast signals in an initial time interval,
simultaneously transmit rotated versions of the plurality of wide beam beam-formed reference and broadcast signals in subsequent time intervals, wherein the plurality of wide beam beam-formed reference and broadcast signals are rotated by a narrow beam beam-width during each subsequent time interval, and
receive an indication of a wide beam spatial boundary between two adjacent wide beam beam-formed reference and broadcast signals of the plurality of wide beam beam-formed reference and broadcast signals, from a user equipment (UE).

29. The eNB of claim 28, wherein the processor executes the instructions to assign a narrow beam direction to the UE in accordance with the indication of the wide beam spatial boundary.

30. The eNB of claim 28, wherein the processor executes the instructions to receive a random access preamble in a narrow receiver beam, the random access preamble initiating a random access procedure.

* * * * *